Figure 1:
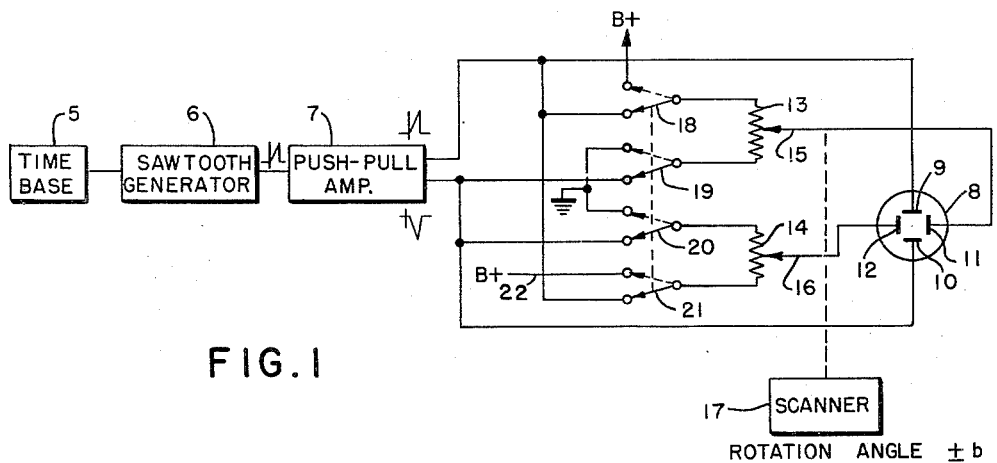

Aug. 13, 1957     E. H. B. BARTELINK     2,803,005

CATHODE RAY TUBE PRESENTATION

Filed April 17, 1946

*INVENTOR.*
EVERHARD H. B. BARTELINK
BY
ATTORNEY

United States Patent Office 2,803,005
Patented Aug. 13, 1957

2,803,005

CATHODE RAY TUBE PRESENTATION

Everhard Hendrick Bernard Bartelink, Cambridge, Mass., assignor, by mesne assignments, to the United States of America as represented by the Secretary of the Navy Application April 17, 1946, Serial No. 662,682

6 Claims. (Cl. 343—5)

This invention relates to radar systems, and more particularly to cathode ray tube indicators for radar systems.

In the use of cathode ray tubes as radar indicators it is desirable to use a presentation which will reduce distortion to a minimum. To meet this requirement the plan position indicator circuit, known as the P. P. I., possesses certain inherent advantages over other displays. In the P. P. I. circuit the range and bearing of targets are presented in polar coordinates. This presentation reduces map distortion, and facilitates the recognition of the radar map as shown on the cathode ray tube screen when it is compared to a regular map.

The disadvantages of the commonly employed P. P. I. circuits lie in the weight and bulk resulting from complicated circuitry, particularly when magnetic deflection type cathode ray tubes are employed. To overcome these disadvantages, especially in airborne installations, efforts have been made to utilize electrostatic type cathode ray tubes in P. P. I. circuits. It will be evident that to accomplish this some system of resolvers mechanically coupled to the antenna system must be used to apply sweep voltages which vary in relative amplitude as the antenna is moved in azimuth to the separate sets of deflection plates. To prevent the introduction of distortion into the sweep voltage circuits, the sweep voltages must be carried between the antenna and the indicator at low impedance levels, requiring considerable power from the sweep voltage generators. The present invention provides a modified P. P. I. sector scan using an electrostatic tube with the circuit so arranged that only a small fraction of the total sweep energy must be fed through low impedance circuits.

Tactical situations sometimes require a change in the type of radar presentation in use. For example, if an aircraft is approaching a target by following radar information, bearing discrimination can be improved at close range by using a B type of presentation. In the B presentation the bearing and range of reflecting objects are presented in rectangular coordinates on the cathode ray tube screen as the abscissa and ordinate respectively. This invention provides an electrostatic type radar indicator in which the presentation may be readily changed from P. P. I. to a B type scan.

Accordingly it is a principal object of this invention to provide an electrostatic type plan position indicator.

It is also an object of this invention to provide an electrostatic P. P. I. in which only a fraction of the sweep voltage energy must be fed through low impedance circuits.

It is a further object of this invention to provide an electrostatic type radar indicator in which the presentation may be readily changed from the P. P. I. scan to the B type scan.

Figure 2:
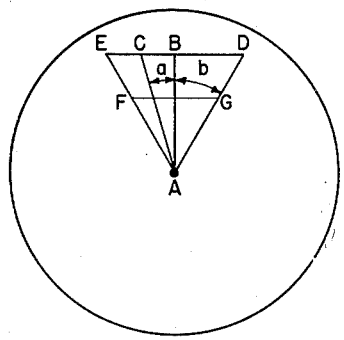
Figure 3:
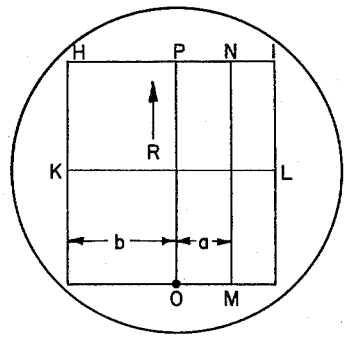

The above and further objects of this invention will become apparent by reference to the following detailed description and the appended drawing of which:

Fig. 1 is a combination block and schematic circuit diagram of the essential components of one embodiment of this invention;

Fig. 2 is a cathode ray tube presentation of a P. P. I. sector type indication possible with this invention; and Fig. 3 shows a B type presentation also obtainable with this invention.

With reference to Fig. 1, the time base generator 5 triggers sawtooth generator 6 coincident with the transmission of the radar pulse. The output of sawtooth generator 6 is fed to push-pull amplifier 7, whose output is fed directly to vertical deflection plates 9 and 10 of an electrostatic type cathode ray tube 8. Time base generator 5, sawtooth generator 6, and push-pull amplifier 7 are of conventional design. The sawtooth voltages obtained from amplifier 7 and applied to plates 9 and 10 deflect the electron beam of cathode ray tube 8 along a vertical axis. Potentiometers 13 and 14 have their moving contacts 15 and 16 connected to the horizontal deflection plates 11 and 12, respectively, of cathode ray tube 8. These moving contacts are mechanically coupled together and also to scanner 17, the scanner being a parabolic reflector which directs the energy from the antenna into a beam. Switches 18, 19, 20, and 21 are connected as shown and the movable contacts of these switches are mechanically ganged. With switches 18, 19, 20, and 21 in the down position, as shown in Fig. 1, the output of amplifier 7 is connected across the terminals of potentiometers 13 and 14. As the movable arms 15 and 16 are moved upward along the resistance strips of potentiometers 13 and 14, it is evident that the amplitudes of the sawtooth voltages applied to horizontal plates 11 and 12 increase in a certain direction. As the movable arms are moved downward along the resistance strips of potentiometers 13 and 14, the sawtooth voltages applied to these plates increase in the opposite direction. With the movable arms at the exact electrical centers of the potentiometers there is no effective voltage applied to plates 11 and 12 by the output of amplifier 7, and, therefore, no horizontal deflection of the electron beam.

More specifically, with movable contacts 15 and 16 coupled to and so phased with scanner 17 that these contacts are at the exact electrical centers of potentiometers 13 and 14 when the beam produced by scanner 17 is in a dead-ahead position, the net voltage on horizontal plates 11 and 12 is then equal to zero, so that the only effect on the electron beam is due to the sawtooth voltages on vertical plates 9 and 10, resulting in a movement of the electron beam from plate 10 toward plate 9. Under these conditions the electron beam will trace a vertical line, indicating range, on the face of the cathode ray tube as shown in Fig. 2 by line AB. As the beam of energy produced by scanner 17 rotates from a dead-ahead position in a counter-clockwise manner, the mechanical coupling between movable arms 15 and 16 and scanner 17 moves the contacts from the center positions of potentiometers 13 and 14 upward along the resistance strips of these potentiometers, thus applying a portion of the sawtooth voltages from amplifier 7 to horizontal plates 11 and 12, the magnitudes of these voltages being proportional to the distances contacts 15 and 16 have been moved from the respective electrical centers of potentiometers 13 and 14 by motion of scanner 17. Under these conditions the voltage on plate 11 becomes less positive while that on plate 12 becomes more positive, causing the electron beam to be deflected toward plate 12 in addition to the vertical deflection due to the sweep voltages on plates 9 and 10. The amount of the deflection is represented on Fig. 2 by angle "a," which is equal to the angle of rotation of the antenna beam from the dead-ahead position. The combination of sweep voltages thus provided to the deflection plates of tube 8 results in a trace on the screen as generally indicated on Fig. 2 by the line A. C. In a similar manner, if contacts 15 and 16 are moved downward along the resistance strips of potentiometers 13 and 14 by a clockwise rotation of scanner 17, then the voltage applied to plate 11 becomes more positive while that applied to plate 12 becomes less positive, causing the electron beam to be deflected toward plate 11 by an amount proportional to the angle of rotation of the antenna beam in the clockwise direction. Angle "a" is a maximum and equal to angle "b" when contacts 15 and 16 are at either extremes of potentiometers 13 and 14. The above described action produces on the face of the cathode ray tube 8 a modified P. P. I. sector as shown in Fig. 2. Lines DE and FG are lines of constant range, such lines being parallel straight lines in this presentation as opposed to concentric circles in the usual P. P. I. pattern. It will be apparent that in the circuit of Fig. 1 only that fraction of the sweep voltage energy which is used to deflect the electron beam horizontally is fed through the resistive resolvers, and hence only that fraction of the energy need be fed through low impedance channels, thus reducing the required power output of amplifier 7.

Should a B type presentation be desired, switches 18, 19, 20, and 21 are moved to the upper position as shown by the dotted contact arms in Fig. 1. The voltage across the resistance strips of potentiometers 13 and 14 is then a constant value obtained from a D. C. voltage source at terminal 22. The potentiometers are so connected that as contact arms 15 and 16 are moved upward along the resistance strips of these potentiometers by motion of scanner 17, the voltage on plate 11 becomes more positive while that on plate 12 becomes less positive. This action causes the electron beam to be deflected toward plate 11 by an amount represented as the angle "a" on Fig. 3, which is proportional to the angle of rotation in a clockwise direction of the antenna beam from the dead-ahead position. This movement of the beam results in a trace on the face of cathode ray tube 8, indicated in Fig. 3 by line MN, or more generally by "R" denoting range. In a similar manner, if contacts 15 and 16 are moved downward along the resistance strips of potentiometers 13 and 14 by the action of scanner 17, then the voltage applied to plate 11 becomes less positive while that applied to plate 12 becomes more positive. This action causes the electron beam to be deflected toward plate 12 by an amount proportional to the angle of rotation of the antenna beam from dead-ahead in a counter-clockwise direction. Angle "a" is a maximum and equal to angle "b" (Fig. 3) when the movable contacts are at either extreme of the resistance strips of potentiometers 13 and 14. The sawtooth sweep voltages applied to vertical deflection plates 9 and 10 by amplifier 7 cause a vertical deflection of the electron beam proportional to range. Thus is produced the familiar B type scan as shown in Fig. 3, in which lines HI and KL are lines of constant range.

The above described embodiment of the invention is to be considered illustrative of the principles thereof, and the scope of the invention is defined by the appended claims.

What is claimed is:

1. An indicator for use with a radio pulse echo detection system employing a rotatable antenna, said indicator comprising a cathode ray tube, said cathode ray tube including a fluorescent screen and an electron beam source, means coupled to said cathode ray tube for periodically deflecting the beam from said beam source in a first direction across said screen, said deflection being substantially linear with time and synchronized with the time of pulse transmission from said radio pulse echo detection system, a potentiometer comprising a resistor and a tap movable along said resistor, said tap being coupled to said antenna so as to move along said resistor in accordance with the position of said antenna about the axis of rotation thereof, a switch means having first and second positions, a first source of constant potential, a second source of potential providing a signal periodically changing in amplitude substantially linearly with time and in synchronism with the transmission of pulses from said radio pulse echo detection system, said switch when in said first position coupling said resistor across said first source of potential, said switch when in said second position coupling said resistor across said second source of potential, and means coupled to said tap for deflecting a beam from said beam source in a second direction at right angles to said first direction, the deflection of said beam in said second direction being a function of the instantaneous potential of said tap.

2. An indicator for use with a radio pulse echo detection system employing a rotatable antenna, said indicator comprising, a cathode ray tube including a fluoresecent screen, an electron beam source, first deflecting means for deflecting a beam from said source in a first direction across said screen, second deflecting means for deflecting said beam across said screen in a second direction at right angles to said first direction, means coupling a signal to said first deflecting means to periodically scan said beam in said first direction in synchronism with the transmission of pulses from said system, a potentiometer comprising a resistor and a tap movable along said resistor, said tap being coupled to said antenna so as to move along said resistor in accordance with the position of said antenna about the axis of rotation thereof, a switch means having first and second positions, a first source of constant potential, a second source of potential providing a signal periodically changing in amplitude substantially linearly with time and in synchronism with the transmission of pulses from said radio pulse echo detection system, said switch when in said first position coupling said resistor across said first source of potential, said switch when in said second position coupling said resistor across said second source of potential, and means coupling said tap to said second deflecting means, said beam thereby being deflected in said second direction by an amount proportional to the instantaneous potential of said tap.

3. An indicator for use with a radio pulse echo detection system employing a rotatable antenna, said indicator comprising a cathode ray tube including a fluorescent screen, an electron beam source, first deflecting means for deflecting a beam from said source in a first direction across said screen, second deflecting means for deflecting said beam across said screen in a second direction at right angles to said first direction, a first signal source providing a signal periodically changing in amplitude substantially linearly with time and in synchronism with the transmission of pulses from said radio pulse echo detection system, means coupling said signal source to said first deflecting means to provide a periodic deflection of said beam in said first direction, a potentiometer comprising a resistor and a tap movable along said resistor, said tap being coupled to said antenna so as to move along said resistor in accordance with the position of said antenna about the axis of rotation thereof, a source of constant potential, a switch means having first and second positions, said switch means when in said first position coupling said signal from said signal source across said resistor, said switch when in said second position coupling said resistor across said source of constant potential, and means coupling said tap to said second deflecting means, said beam thereby being deflected in said second direction by an amount proportional to the instantaneous potential of said tap.

4. An indicator for use with a radio pulse echo detection system employing a rotatable antenna, said indicator comprising a cathode ray tube including a fluorescent screen, an electron beam source, a first pair of deflecting means for deflecting a beam from said source in a first direction across said screen, a second pair of deflecting means for deflecting said beam across said screen in a second direction at right angles to said first direction, a first signal source having first and second outputs, the signals at said outputs being in push-pull, each of said signals periodically changing in amplitude substantially linearly with time and in synchronism with the transmission of pulses from said radio pulse echo detection system, means coupling said first and second outputs of said signal source to the first and second deflecting means, respectively, of said first pair of deflecting means to provide a periodic deflection of said beam in said first direction, first and second potentiometers each comprising a resistor and a tap movable along said resistor, said taps being coupled to said antenna so as to move along their associated resistors in accordance with the position of said antenna about the axis of rotation thereof, a source of constant potential having first and second terminals, a switch having first and second positions, said switch when in said first position coupling said two resistors in parallel between said first and second outputs of said signal source, said switch when in said second position coupling said two resistors in parallel between said first and second terminals of said source of constant potential, and means for coupling each of said two taps to a separate deflecting means in said second pair of deflecting means, said beam thereby being deflected in said second direction by an amount dependent upon the instantaneous potentials of said taps.

5. An indicator for use with a radio pulse echo detection system employing a rotatable antenna, said indicator comprising a cathode ray tube including a fluorescent screen and an electron beam source, means coupled to said cathode ray tube for periodically deflecting a beam from said beam source in a first direction across said screen, said deflection being a substantially linear function of time and synchronized with the time of pulse transmission from said radio pulse echo detection system, a signal divider having an input, an output, and a control element movable to alter the fraction of the signal applied to said input appearing at said output, said control element being coupled to said antenna so as to move in accordance with the position of said antenna about the axis of rotation thereof, a switch having first and second positions, a first source of constant amplitude signal, a second signal source providing a signal periodically changing in amplitude substantially linearly with time and in synchronism with the transmission of pulses from said radio pulse echo detection system, said switch when in said first position coupling said input of said signal divider to said source of constant amplitude signal, said switch when in said second position coupling said input of said signal divider to said second signal source, and means coupling said output of said signal source to said cathode ray tube to deflect said beam in a second direction at right angles to said first direction, the deflection of said beam in said second direction being a function of the amplitude of signal at said output of said signal divider.

6. An indicator for use with a radio pulse echo detection system employing a rotatable antenna, said indicator comprising a cathode ray tube including a fluorescent screen, an electron beam source, first deflecting means for deflecting a beam from said source in a first direction across said screen, second deflecting means for deflecting said beam across said screen in a second direction at right angles to said first direction, a first signal source providing a signal periodically changing in amplitude substantially linearly with time and in synchronism with the transmission of pulses from said radio pulse echo detection system, means coupling said signal source to said first deflecting means to provide a periodic deflection of said beam in said first direction, a signal divider having an input, an output and a control element movable to alter the portion of the signal applied to said input appearing at said output, said control element being coupled to said antenna so as to move in accordance with the position of said antenna about the axis of rotation thereof, a source of constant amplitude signal, a switch means having first and second positions, said switch means when in said first position coupling said signal from said first signal source to the input of said signal divider, said switch when in said second position coupling said source of constant amplitude signal to said signal divider, and means coupling the output of said signal divider to said second deflecting means, said beam thereby being deflected in said second direction by an amount proportional to the instantaneous amplitude of the signal at the output of said signal divider.

References Cited in the file of this patent

UNITED STATES PATENTS

| | | |
|---|---|---|
| 2,406,358 | Doba | Aug. 27, 1946 |
| 2,409,456 | Tolson et al. | Oct. 15, 1946 |
| 2,419,205 | Feldman | Apr. 22, 1947 |
| 2,421,747 | Engelhardt | June 10, 1947 |
| 2,422,975 | Nicholson | June 24, 1947 |
| 2,512,703 | Wilkerson | June 27, 1950 |